May 13, 1941.  W. L. SCRIBNER  2,241,870

LUBRICATING DEVICE

Filed Feb. 2, 1940

INVENTOR:
William L. Scribner,
by Carr, Carr & Gravely,
HIS ATTORNEYS

Patented May 13, 1941

2,241,870

UNITED STATES PATENT OFFICE 2,241,870

LUBRICATING DEVICE

William L. Scribner, Canton, Ohio, assignor to The Timken Roller Bearing Company, Canton, Ohio, a corporation of Ohio Application February 2, 1940, Serial No. 316,921

5 Claims. (Cl. 308—86)

This invention relates to lubricating devices for roller bearing axle constructions with standard A. A. R. journal boxes. It has for its principal objects to provide a simple yet efficient lubricating device for the roller bearing axle construction and to provide for the retention of lubricant within the journal box.

The invention consists principally in the lubricating device and in the parts, combinations and arrangements of parts hereinafter described and claimed.

The roller bearing axle construction disclosed but not claimed in this specification is covered by an application for Roller bearing axle construction, Serial No. 316,922, filed February 2, 1940.

Figure 1:
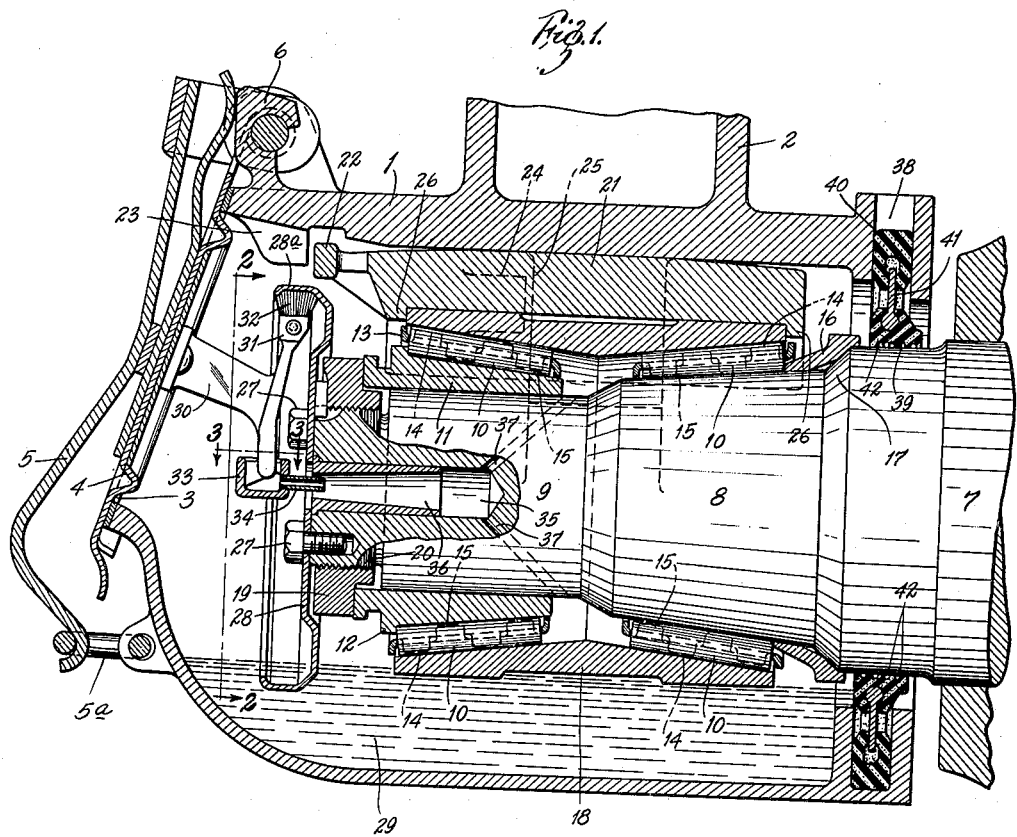
Figure 2:
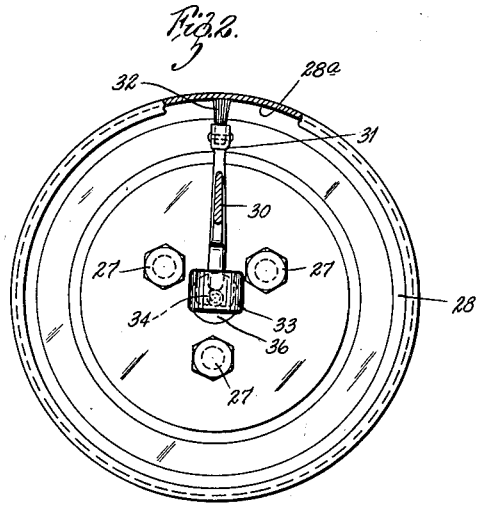
Figure 3:
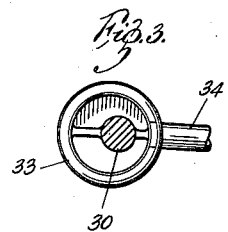

In the accompanying drawing, wherein like reference numerals refer to like parts wherever they occur, Fig. 1 is a longitudinal sectional view of a railway car axle construction embodying my invention, Fig. 2 is a view taken on the line 2—2 in Fig. 1, and Fig. 3 is a view taken on the line 3—3 in Fig. 1.

In the drawing is shown a standard A. A. R. journal box 1 whose upper portion is integral with a truck side frame member 2. The outer end of the journal box is provided with an opening 3 and with a closure cap 4 therefor, said closure cap being secured in position by means of a clamp spring member 5 whose lower end is held by a loop 5a secured to said journal box. The top of the journal box is provided at its outer end with a lug 6 of the kind commonly used for hingedly securing present standard closure caps to the journal box; so that hinged caps of the present type may be used, if desired. The lug 6 supports the upper end of the cap 4 which is hingedly mounted thereon.

Projecting into the journal box is the reduced end portion or journal of an axle 7. The journal portion comprises a tapered innermost portion 8 and a cylindrical outermost portion 9 of considerably smaller diameter than the main axle portion. Special axles may be used or ordinary axles may be machined to provide the tapered portion which is fire hardened or hardened by any other suitable means.

Mounted on the reduced end portion or journal of the axle is an anti-friction bearing, preferably a tapered roller bearing. In the construction illustrated, the bearing shown comprises two series of conical rollers 10. A bearing cone or inner raceway member 11 having a thrust rib 12 at its large end is provided on the outermost portion 9 of the journal for the outermost series of rollers, the large ends of which abut against the thrust rib. The tapered portion 8 of the axle journal serves as an inner raceway member for the innermost series of rollers. Suitable cages 13 having outturned flaps 14 and inturned flaps 15 are provided for the rollers whereby each cage and its rollers are self-contained. The innermost rollers abut against a spacing ring 16 mounted against a shoulder 17 on the axle. The rollers are thus held in position between the thrust rib and the spacing ring. A double cup 18 having two bore portions tapering toward the middle to constitute conical raceways is provided for the rollers.

The cone on the outermost portion of the journal abuts against and is held by a locking and adjusting nut 19 mounted on the threaded end 20 of the axle.

Interposed between the bearing and the journal box is a wedge 21 having a thrust end portion 22 adapted to cooperate with the usual lug 23 depending from the under surface of the top of the journal box near the outermost end of said wedge. Thrust ribs 24 extend outwardly on either side of the wedge to cooperate with central thrust ribs 25 extending from the journal box. The wedge has downwardly extending projections 26 adapted to retain the bearing cup.

Secured to the end of the axle by screws 27 is a thin dish-shaped member 28 whose lower portion extends into the oil 29 in the bottom of the journal box. A bracket 30 having a collector brush 31 preferably integral therewith is welded or fastened by other suitable means to the journal box cap. Preferably, this brush has brass wire bristles 32 adapted to sweep the rim 28a of the dish-shaped member and collect oil therefrom. Secured to the lower end of the brush and preferably integral therewith is an oil box or reservoir 33 having a small pipe 34 extending therefrom. The pipe extends into a horizontal bore 35 in the central portion of the axle. A supporting sleeve 36 is positioned in this bore. Openings 37 leading from the central bore communicate with oil spaces between the rollers.

To retain the lubricant in the journal box, the innermost end of the journal box is double walled and a space 38 is provided between the walls to receive a closure member. The closure member comprises an inner ring 39 and an outer concentric ring 40 of neoprene or similar elastic material connected by a metal ring 41 of any suitable material. The closure member seats on the shoulder of the axle and grooves 42 in the inner elastic ring 39 are adapted to prevent the escape of oil.

The operation of the lubricating device is as follows, the axle 7 rotates thereby turning the dish-shaped member 28 secured to the end thereof. Oil is collected and carried around to the brush 31 whose bristles 32 sweep the oil therefrom. The oil then runs down the brush by gravity and into the box 33. The pipe 34 leading from the box carries oil to the bore 35 and centrifugal force flings the oil through the openings 37 leading to the oil space between the bearings.

The bracket arm 30 is secured to the cap 4 and when the cap is raised to oil or inspect the journal box, the collector unit is moved out of the way.

The constructions herein described have numerous advantages. Antifriction bearings of roller type may be applied to a standard journal box instead of requiring a special journal box as has heretofore been necessary. The plain bearings of cars now in use may be replaced by these roller bearings. My lubricating arrangement is simple and efficient and insures proper lubrication at all times. Increased rotative speed of the axle increases the rotative speed of the dish and additional oil is supplied thereby. Centrifugal force insures a sufficient amount of oil reaching the bearing.

Obviously, the invention herein described admits of considerable modification and I do not wish to be limited to the precise constructions shown.

What I claim is:

1. A car axle construction comprising an axle, a journal box into which said axle extends, a bearing mounted on said axle, an oil conveying member secured to said axle, an oil sweeper member secured to said journal box, an oil reservoir adjacent to said sweeper member, said reservoir having a pipe communicating with a central bore in said axle and openings from said central bore leading to said bearing.

2. A car axle construction comprising an axle, a journal box into which said axle extends, a bearing mounted on said axle, an annular member secured to said axle, said annular member extending into the bottom of said journal box, an oil sweeper member secured to the journal box, said sweeper member abutting against the upper portion of said annular member, an oil reservoir adjacent to the end of said sweeper member, said reservoir having a pipe extending into a central bore in said axle and openings from said central bore communicating with said bearing.

3. A car axle construction comprising an axle, a journal box into which said axle extends, a bearing mounted on said axle, and a dish-shaped member secured to said axle, said dish-shaped member extending into the bottom of said journal box, a brush member secured to the journal box, a brush on said brush member adapted to sweep said dish-shaped member, an oil reservoir secured to said brush member, said reservoir having a pipe extending into a central bore in said axle and openings from said central bore leading into said bearing.

4. A car axle construction comprising an axle, a journal box into which said axle extends, a bearing mounted on said axle, and a dish-shaped member secured to the end of the axle, said dish-shaped member extending into the bottom of the journal box, a bracket and brush member secured to the journal box, a brush on said brush member adapted to sweep the rim of said dish-shaped member, a reservoir secured to the lower end of said brush member, said reservoir having a pipe communicating with a central bore in said axle and openings from said central bore leading into said bearing.

5. A car axle construction comprising an axle, a journal box into which said axle extends, a bearing mounted on said axle, a dish-shaped member secured to the end of the axle, said dish-shaped member extending into the bottom of the journal box, a bracket and brush member secured to the journal box lid, a wire brush on said brush member abutting against the upper portion of the rim of said dish shaped member, an oil reservoir secured to the lower end of said brush member, said reservoir having a pipe extending into a central bore in said axle and openings from said central bore leading into said bearing.

WILLIAM L. SCRIBNER.